United States Patent [19]

Schlig et al.

[11] 4,117,471
[45] Sep. 26, 1978

[54] LIGHT PEN DETECTION AND TRACKING WITH AC PLASMA DISPLAY PANEL

[75] Inventors: Eugene Stewart Schlig, Somers; George Raymond Stilwell, Jr., West Nyack, both of N.Y.

[73] Assignee: International Business Machines Corporation, Armonk, N.Y.

[21] Appl. No.: 715,465

[22] Filed: Aug. 18, 1976

[51] Int. Cl.² ............................................. G08B 23/00
[52] U.S. Cl. ........................ 340/324 M; 340/166 EL; 315/169 TV
[58] Field of Search .................... 340/324 M, 166 EL; 315/169 TV

[56] References Cited

U.S. PATENT DOCUMENTS

| | | | |
|---|---|---|---|
| 3,851,327 | 11/1974 | Ngo | 340/324 M |
| 3,875,472 | 4/1975 | Schermerhorn | 340/324 M |
| 3,967,267 | 6/1976 | Ngo | 340/324 M |
| 3,976,992 | 8/1976 | Criscimagna et al. | 340/324 M |

Primary Examiner—Nelson Moskowitz
Assistant Examiner—T. M. Blum
Attorney, Agent, or Firm—John A. Jordan; Bernard N. Wiener

[57] ABSTRACT

A light pen detection and tracking scheme for detecting and tracking both "on" and "off" cells with a single cursor voltage waveform in an AC gas discharge display panel. The special cursor voltage waveform is applied to the panel during the sustain cycle, in either a line-by-line or binary scanning fashion, to momentarily fire both "on" and "off" cells so that they may be detected by the light pen without a loss of the memory state of the cells. A cross-hair cursor is automatically displayed at the pen position when the search scan is complete. Since both "on" and "off" cells are detected, the system can respond to pen motion by repeating the search to reacquire the pen, so that no special tracking strategy is needed.

25 Claims, 6 Drawing Figures

LIGHT PEN DETECTION AND TRACKING WITH AC PLASMA DISPLAY PANEL

BACKGROUND OF THE INVENTION

1. Field of the Invention

The present invention relates to gas discharge display and memory devices. More particularly, the present invention relates to light pen detection and tracking methods and apparatus for detecting the position and movement of a light pen on the surface of an AC gas discharge display and memory panel.

2. Description of the Prior Art

Gas discharge display and memory panels of the type to which the present invention pertains are well known in the art. For example, U.S. Pat. No. 3,499,167 to Baker et al describes such a panel. The gas panels of the type to which the present invention pertains typically have two glass plates maintained in spaced-apart relationship, and are arranged to have sealed between the spaced-apart plates an ionizable medium. To provide matrix addressability whereby selected local regions within the ionizable medium may be selectively ionized, sets of horizontal and vertical conductors are employed. Typically, the set of horizontal conductors comprises an array of parallel insulated conductors arranged on the inner surface of one plate and horizontally extending thereacross. Likewise, the set of vertical conductors comprises an array of parallel insulated conductors arranged on the inner surface of the other plate vertically extending thereacross, generally orthogonal to the horizontal conductors.

In such arrangements, when an appropriate voltage is applied between a selected one of the horizontal conductors and a selected one of the vertical conductors, ionization occurs at the crossover point of the two conductors, such that light is emitted. Generally, the crossover points are referred to as "cells" and a display pattern or image is formed by ionizing selected cells. For another example of a panel as described and to which the present invention pertains, reference is made to an article by D. L. Bitzer et al entitled "The Plasma Display Panel — A Digitally Addressable Display with Inherent Memory," Proceedings of the Fall Joint Computer Conference IEEE, San Francisco, California, November 1966, pp. 541–547.

Although light pen detection and tracking functions have been implemented in prior art AC gas discharge display and memory panels, such prior art implementations have been found to be inadequate for a variety of reasons. Typically, the prior art light pen detection and tracking approaches involve disturbing information stored in the panel. One form of panel information disturbance is that utilized by Tucker in U.S. Pat. No. 3,852,721. In Tucker, light pen tracking is achieved by positioning a cursor on the display panel. Displaying the cursor necessitates the storing of the information overwritten in the plasma panel by the cursor until the cursor has moved on and then rewriting the stored information in its original location. Obviously, such an approach necessitates the use of memory (in addition to the panel memory) for purposes of regenerating the former information state lost as a result of the formation of the cursor. In addition, such an approach necessarily involves additional control circuitry for moving the information back and forth between the memory and panel.

Another approach to light pen detection and tracking involves a partial disturbance of the memory state of the cells of the panel. Such partial disturbance approaches endeavor to detect the light pen location without destroying the memory state of the pattern of "on" and "off" cells in the panel. Since the condition of the cells in the "on" state is significantly different from the cells in the "off" state, the partial disturbance approach necessitates separate treatment of the "on" cells from the "off" cells. For example, U.S. Pat. No. 3,887,767 to Miller describes a light pen detection scheme wherein several steps are involved to first disturb the "off" cells to a degree to permit their detection without the loss of the state, and then to disturb the "on" cells to a degree sufficient to permit their detection without the loss of their memory state. Miller effects his detection processes in two passes of the panel, the first to disturb the "off" state cells and the second to disturb the "on" cells. In the latter instance, the coordinates of cells in the "on" state of discharge are identified by inverting the device stored states to place them to the "off" state, employing the same interrogation sequence as is employed to detect the "off" state cells and then reinverting the stored states.

Another prior art partial disturbance approach is that described by Ngo in U.S. Pat. No. 3,851,327 and SID articles entitled, respectively, "Light Pen Capability on Plasma Display Panel," *Digest of Technical Papers,* 1974 SID International Symposium, May 1974, pp. 24 and 25, and "Dynamic Light Pen Tracking on a Plasma Panel," *Digest of Papers,* 1974 SID International Symposium, May 1974, pp. 26 and 27. In general, the above-cited Ngo patent and articles describe a technique for detecting a position of a light pen over lighted areas, i.e., "on" cells of an AC plasma panel.

A further article by Ngo entitled "Light Pen Detection Over Dark Areas of an AC Plasma Panel," *Digest of Technical Papers,* 1975 SID International Symposium, pp. 110 and 111, describes a technique for detecting the position of a light pen over dark areas, i.e., "off" cells of an AC plasma panel. One of the problems encountered in detecting "off" cells by partial disturbance is wall charge build-up in the dark areas. Because of the wall charge build-up problem, constraints are necessarily imposed upon systems using a partial disturbance approach, and affirmative steps necessarily have to be implemented to obviate this problem.

One further difficulty with the Ngo approach resides in the fact that the delayed selective erase pulse used to detect "on" cells may act to reduce the panel sustain margin. In order to obviate this problem, Criscimagna et al describe in an article entitled "Light-Pen Detection with a Plasma Display Panel," IEEE Transactions on Electron Devices, Vol. 22, September 1975, pp. 796–799, an approach wherein the sustain segment is used as the selective erase disturb pulse. Basically, Criscimagna et al utilize a disturb pulse made up of an additional sustain alteration, selectively applied to each cell or line to move the light output of a selected cell ahead in time.

Another approach to light pen detection is that described by Schermerhorn in U.S. Pat. No. 3,875,472. In general, the Schermerhorn approach involves a multi-cell device having addressable subsites in each cell. By using addressable subsites, the panel may be selectively scanned with signals to address less than all of the subsites, whereby detection is achieved.

The difficulty with all of the above-described light pen detection techniques resides in the fact that they are complex and cumbersome, requiring multiple procedures and/or apparatus. In general, such approaches are costly, in that they necessitate a special apparatus and/or impose constraints on the operating characteristics and conditions of conventional AC gas discharge display panels.

It is, therefore, an object of the present invention to provide an improved AC gas discharge display system.

It is yet a further object of the present invention to provide an improved light pen detection and tracking method and apparatus for AC gas discharge plasma display panels.

It is yet still a further object of the present invention to provide a light pen detection and tracking scheme for plasma display panels which is simple in design and effective in operation.

It is another object of the present invention to provide a light pen detection and tracking arrangement for AC plasma display panels which is rapid in response, i.e., can follow a light pen in real time without the necessity of a complex tracking strategy.

It is still another object of the present invention to provide a light pen detection and tracking arrangement for plasma display panels which permits nondestructive scanning of the panel in a single detection cycle to detect both "on" and "off" cells using a single waveform complex in phase with the normal sustain cycle such that conventional plasma display panels and drive circuitry may be utilized.

It is yet still another object of the present invention to provide a light pen detection and tracking arrangement for plasma display panels wherein both "on" and "off" cells are nondestructively scanned in a single pass by a special scan waveform complex which acts, in a single cycle, to fully change the respective states of the panel cells and then to fully return such cells to their original state.

It is yet still another and further object of the present invention to provide a light pen detection and tracking arrangement for an AC gas display panel which utilizes the same waveform complex as may be used to form a cursor at the detected location of the light pen.

SUMMARY

In accordance with the principles of the present invention, a light pen detection and tracking arrangement for detecting the position of a light pen on the surface of an AC plasma display panel is provided by scanning both the "on" and "off" cells in a single pass of both the horizontal and vertical axes with a cursor scan waveform complex which is nondestructive to the memory state of the cells. One or several cycles of the special cursor scan waveform complex may be applied to the lines of one axis and then the other, in either a line-by-line or digital binary or other group scanning approach.

The special cursor scan waveforms are provided in phase with the normal sustain signal, and generally comprise a first voltage level approximately equal to the amplitude of the voltage level of the sustain pulse $V_s$, and then a voltage level of approximately equal to twice that of the voltage level of the sustain pulse and of the same polarity as the first voltage level, and thereafter a brief interval of approximately zero volts prior to an ensuing zero crossover. The zero crossover is typically achieved by a sustain pulse of polarity opposite to the polarity of the first and second levels arranged to precede the next special cursor waveform. Alternatively, said cursor scan waveforms may each include at least an excursion of polarity opposite to that of said first and second voltage levels, after the occurrence of said interval of approximately zero volts, and prior to the occurrence of the next cursor scan waveform. Upon detection of the position of the light pen, a cross hair cursor is displayed at that position using the same special cursor waveforms, which are now applied in a continuous sequence so long as the cursor is desired to be maintained. Since a scan may be completed in as little as 600 microseconds, tracking the motion of the light pen may readily be accomplished without a tracking strategy by simply repeating the scan periodically and updating the line address registers after each scan. In this latter mode, a sufficient number of regular sustain cycles are inserted so that information patterns remain visible.

A standard four "rail" or bus drive circuitry arrangement may readily be employed with the special cursor scan drive waveform and horizontal and vertical scanning apparatus to permit both detection and tracking, and visible cursor presentation at the detected point. Since rapid scanning is achieved, applications such as signature verification and the like may readily be implemented. In such an application, positive feedback to the user in the form of a formed signature may be achieved by using the detected points or addresses to provide decode signals to the latch circuitry for a dynamic write operation.

The foregoing and other objects, features and advantages of the invention will be apparent from the following more particular description of the preferred embodiments of the invention as illustrated in the accompanying drawings.

DETAILED DESCRIPTION OF THE DRAWINGS

Figure 1:
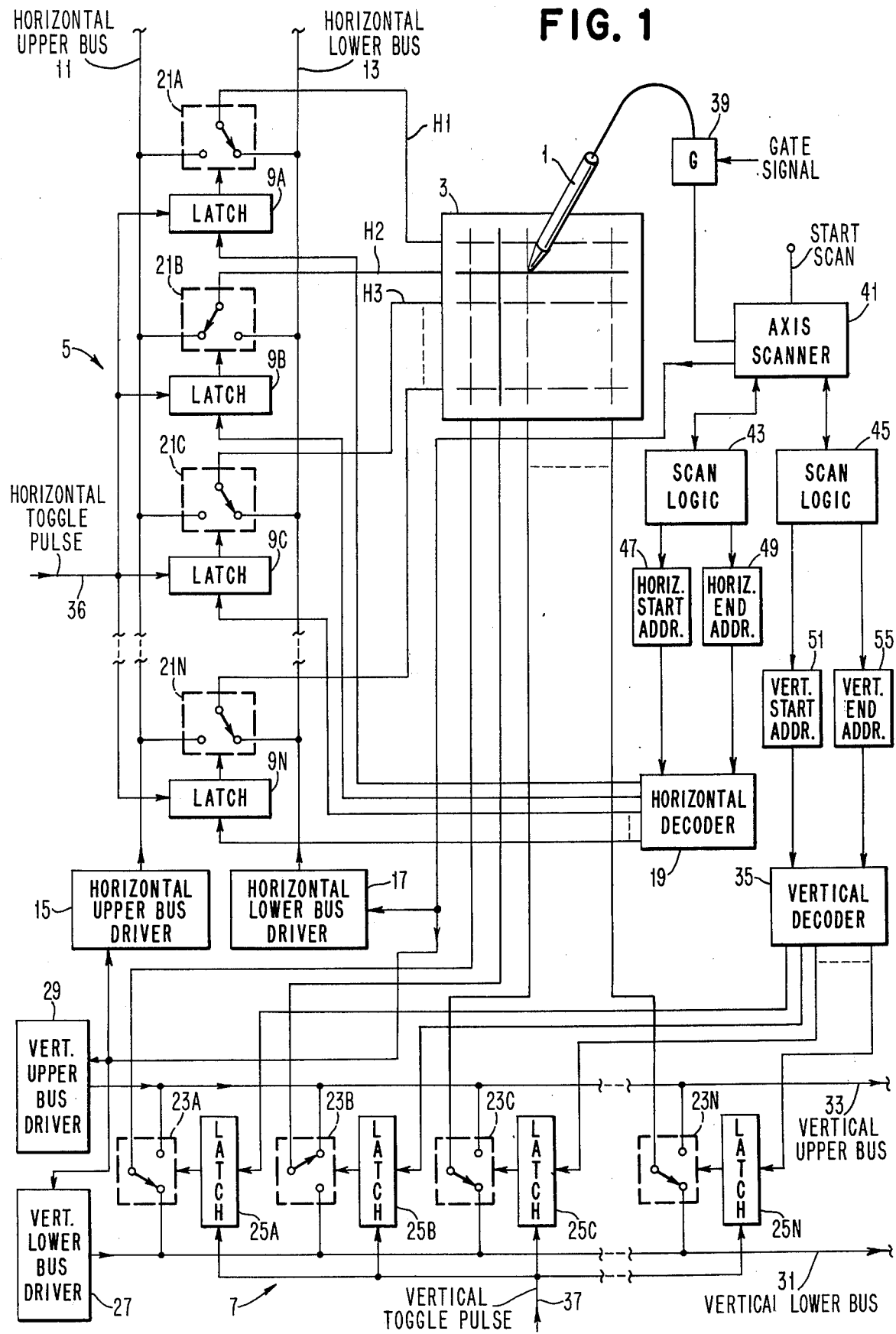
FIG. 1 shows a schematic diagram of a four rail or bus gas discharge display system for light pen detection and tracking, in accordance with the present invention.

The light pen detection and tracking function produced in accordance with the principles of the present invention may readily be implemented via the four rail or bus drive circuitry arrangement shown in FIG. 1. For a further description of four rail or bus drive circuitry per se, reference is made to copending application Ser. No. 372,384 entitled "Method and Apparatus for Gas Display Panel" by Criscimagna, filed June 21, 1973 and assigned to the assignee of the present invention.

Figure 2:
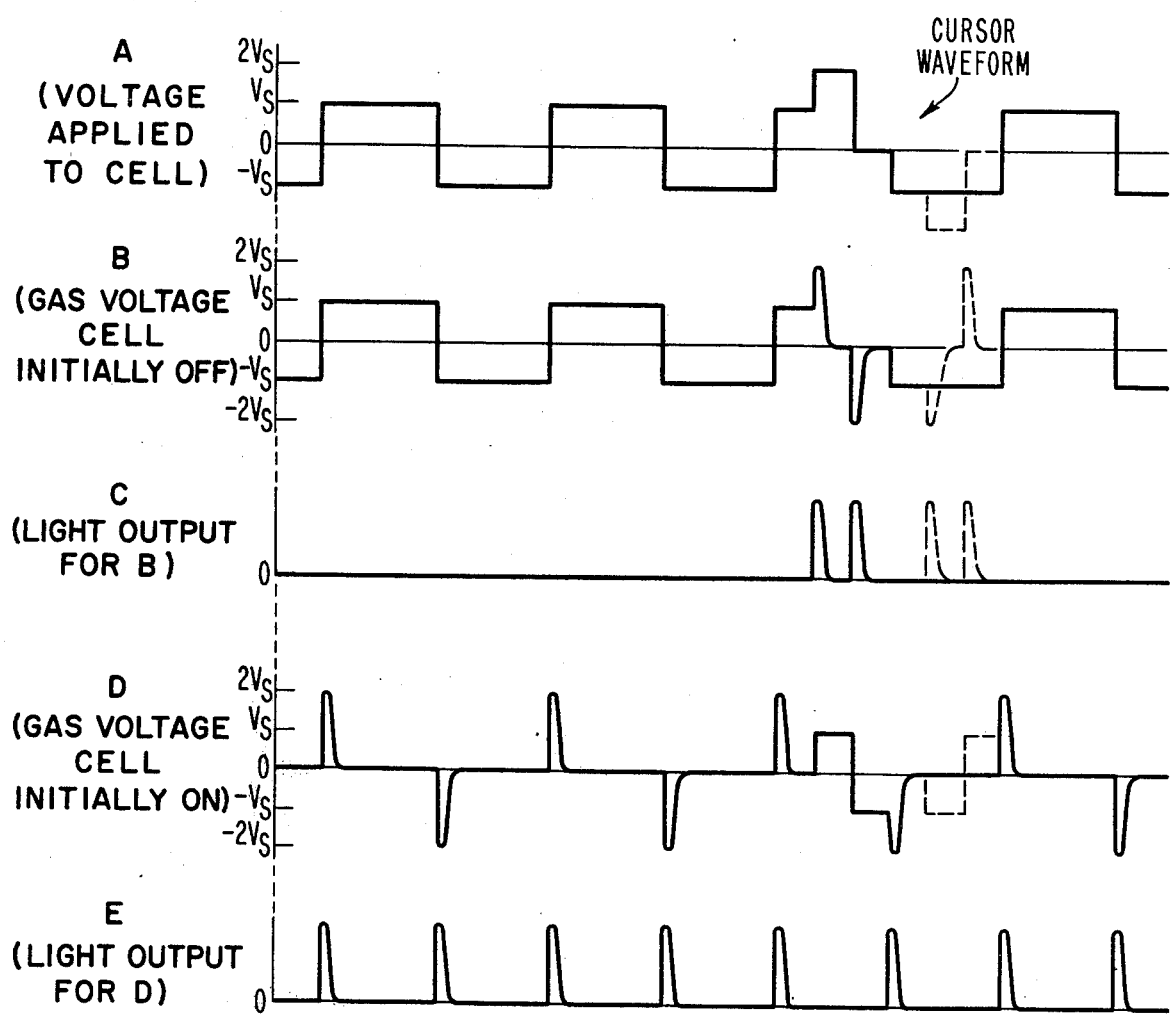
FIG. 2 shows the cursor scan voltage waveform, in accordance with the principles of the present invention, as it is applied across panel cells, and the light output obtained therefrom.

Before discussing the arrangement shown in FIG. 1, reference will first be made to the special cursor scan waveforms as depicted in FIG. 2. In this regard, reference is made to copending application Ser. No. 713,567 now U.S. Pat. No. 4,063,223 entitled Nondestructive Cursors in AC Plasma Displays by Schlig et al filed Aug. 11, 1976 and assigned to the assignee of the present invention. The significance of the special scan voltage waveform as shown in FIG. 2, resides in the fact that when such a voltage waveform is applied across a cell in a scanning operation, the cell will discharge and cause the emission of detectable light without their being a loss in the previous memory state of the cell, whether "on" or "off."

The waveform of line A in FIG. 2 shows the voltage across a cell (electrode to electrode) indicating a typical square sustain waveform being interrupted for one half cycle (third cycle) and being replaced by a special nondestructive cursor scan waveform. In addition, FIG. 2 shows the gas voltage internal to the cell which in turn is the sum of the voltage applied to the cell and the wall voltage of the cell. The wall voltage results from charge stored on the dielectric walls and its magnitude determines the state of the cell, whether "on" or "off." The gas voltages are shown both for previously "on" and "off" cells. The light output for cells which are both previously "on" and "off," in response to the special cursor waveform, is also shown in FIG. 2.

In particular, it can be seen that the third cycle waveform of line B of FIG. 2 depicts the gas voltage (applied voltage plus wall voltage) for an initially "off" (zero wall voltage) cell. The manner in which the gas voltage responds to the special cursor scan waveform can be seen at the first half of the third cycle. Line C of FIG. 2 shows the light output pulses for the case where the cell in question is initially "off." Line D of FIG. 2 shows the gas voltage for a cell which is initially "on," and line E shows the light output pulses for such case. The broken lines depicted in the various waveforms of FIG. 2 represent an alternative scheme wherein the second half of the special cursor scan waveform does not follow the negative sustain waveform, but rather emulates, in the negative direction, that which occurs in the positive direction over the first half cycle. $V_s$ as indicated in FIG. 2 represents the normal sustain amplitude.

FIG. 2 thus illustrates that, during the full sustain cycle, which begins with the modified sustain half cycle wherein the special cursor waveform is created, the cell fires and emits two light pulses when the cell being addressed is initially "off" and two light pulses when the cell being addressed is initially "on." On the other hand, when the normal sustain waveform is restored, the cell reverts to its initial memory state. As can be seen, the special cursor scan waveform is, in general, comprised of a voltage complex of three basic components, to wit, a pulse of given polarity of sustain amplitude ($V_s$), a pulse of the same polarity but approximately twice the sustain amplitude ($2V_s$), and an interval at approximately zero volts. These three components are typically applied in direct sequence or succession, but it should be understood that the components may also occur during separate time intervals as long as no voltage excursion intervene which causes discharges within the cells being addressed. In particular, it is required that no voltage excursions to significant levels of opposite polarity may intervene during the three levels in question, i.e., the sustain amplitude $V_s$, $2V_s$, and approximately zero voltage. It is clear, then, that any of a variety of combinations may be possible without causing intervening discharge within the cell.

As can be seen, the particular cursor scan waveform shown in FIG. 2, line A, is comprised of a positive sustain pulse immediately followed by a positive pulse of amplitude approximately twice that of the sustain which, in turn, is immediately followed by a brief interval at approximately zero volts before an excursion of opposite polarity. In this regard, a negative sustain pulse must precede the next positive cursor pulse, i.e., there must be an excursion of opposite polarity before the next cursor waveform is applied. It should be noted that tolerances on the peak amplitude of the cursor pulse are relatively wide, and the full normal sustain amplitude margin is retained.

FIGS. 3, 4, 5, and 6 represent the manner in which the special cursor scan waveform is applied to panel 3 in FIG. 1 to provide a scanning operation for light pen detection and tracking, in accordance with the principles of the present invention. Whereas the above-cited copending application Ser. No. 713,567 now U.S. Pat. No. 4,063,223 described methods and apparatus for performing a cursor function by the successive application of the special cursor voltage waveform across lines selected to present a visible cursor so long as the cursor is to be used, the present application applies a single cursor scan voltage waveform complex to each of the lines in succession in a scanning mode whereby a light pen may detect the light output provided by each line.

In the four bus gas panel arrangement shown in FIG. 1, the special cursor scan waveforms shown in FIG. 2, used to scan both the horizontal and vertical lines of the panel, may readily be produced by the driver circuitry 5 and 7. By scanning the horizontal and vertical lines using this special cursor waveform, in accordance with the principles of the present invention, the position of the light pen may be located and tracked over both light and dark ("on" and "off," respectively) areas of the panel without disturbing the displayed information and without regenerating the image. The special cursor scan waveform has the effect of firing both "on" and "off" cells, yet leaving their storage state (i.e., the presence or absence of wall charge) undisturbed so that the image formed thereon is continuously maintained. The two axes of the display panel are scanned by applying the cursor waveform to the various lines in a selected sequence, for one or more cycles per line. It has been found, in this regard, that a single cycle of the special cursor waveform is adequate for light pen detection. However, it should be understood that, if desired, several cycles of the special cursor waveform may be applied in the manner described. In accordance with the one embodiment at the time the cursor scan waveform is on a particular selected scan line of a given axis, the sustain is interrupted on the other lines of that axis.

Thus, light is emitted at that time only from the cells which are in the selected scan line in question. In other embodiments, light is emitted from the cells of both selected and nonselected lines.

In the gas discharge display panel drive circuitry arrangement shown in FIG. 1, a light pen 1 is shown positioned over gas panel 3. Accessing the horizontal lines of panel 3 is carried out by horizontal drive circuitry 5, while accessing the vertical lines of the panel is carried out by vertical drive circuitry 7. "Accessing" as used herein refers to operations such as "sustain," "write," "erase," "cursor" and "scan."

Latches 9A-9N in the horizontal drive circuitry of FIG. 1 act to latch switches 21A-21N. Switches 21A-21N are depicted schematically, for illustrative purposes, as single-pole double-throw switches. Typically, such latches would comprise bistable flip flop circuits and such switches would comprise semiconductor switches with a single-pole double-throw function. Any of a variety of semiconductor switches may be used for such purposes.

As can be seen in FIG. 1, horizontal upper bus driver 15 feeds bus 11 and horizontal lower bus driver 17 feeds bus 13. Horizontal decoder 19, as is understood by those skilled in the art, acts to provide the decode logic for setting the states of latches 9A-9N, in accordance with the information to be displayed upon panel 3. The horizontal upper and lower bus drivers 15 and 17 include the sustain waveform and the write and erase pulse generator means typically employed with the sustain waveforms to write and erase the panel as well as the waveforms required to nondestructively scan the panel, in accordance with the presence invention. The superposition of a write and erase pulse on a sustain pulse may be achieved in any of a variety of ways, as is understood by those skilled in the art. In a manner analogous to that described with regard to horizontal drive circuitry 5, the vertical drive circuitry 7 employs switching circuitry 23A-23N to switch back and forth between an upper and lower bus 33 and 31, respectively, to thereby obtain the required waveforms therefor. Latches 25A-25N are set in response to signals from vertical decoder 35. Horizontal and vertical toggle pulses may be applied to lines 36 and 37, respectively, where toggling of the horizontal and vertical latches is desirable for purposes of always maintaining one of the buses associated therewith, positive with respect to the other.

Gate 39, shown in FIG. 1, is coupled between light pen 1 and axis scanner 41. The output of axis scanner 41 is coupled, respectively, to horizontal scan logic 43 and vertical scan logic 45. As can be seen, horizontal scan logic 43 is connected to control both the horizontal start address control register 47 and the horizontal end address control register 49. Likewise, vertical scan logic 45 is coupled to control, respectively, vertical start address control register 51 and vertical end address control register 55. The sets of horizontal and vertical control registers 47-49 and 51-55, in turn, are coupled to horizontal and vertical decoders 19 and 35, respectively, such that the decoders may act to control the horizontal and vertical latches to carry out the scanning operation.

Figure 3:
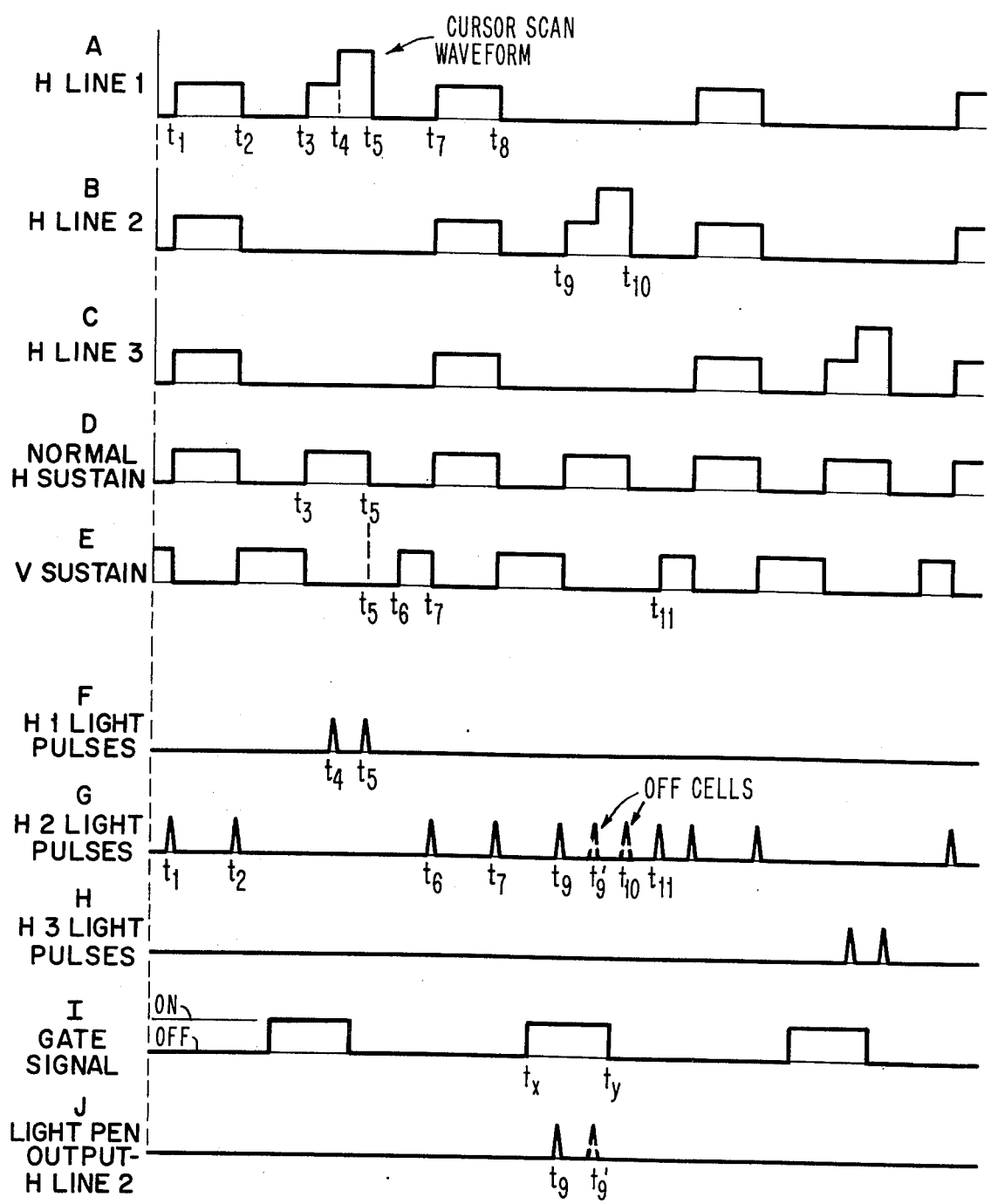
FIG. 3 shows a series of concurrent waveforms representative of the manner in which a line-by-line horizontal scan using the special cursor scan waveforms is achieved, with the sustain being interrupted on all other lines of the scanned axis except the line being scanned.

A description of the operation of the light pen detection and tracking scheme shown in FIG. 1 may best be explained in conjunction with the concurrent waveforms shown in FIG. 3. The first three lines (A, B and C) in FIG. 3, designated "H line number 1," "H line number 2," and "H line number 3," show the scanning waveforms as they are applied to horizontal lines designated H1, H2 and H3. It should be understood that this is merely representative of the scan signals that appear on the first three lines, and that the pattern is carried out for the remainder of the lines of the panel to the Nth line. It should also be understood that for the embodiment represented by the waveforms of FIG. 3, the same sequence of waveforms is likewise applied to the vertical axis after the horizontal axis has been scanned. As will be more fully understood with further explanation, the line-by-line scanning embodiment represented by FIG. 3 acts to cause both "on" and "off" cells to emit a detectable light pulse in response to the cursor scan waveform.

As can be seen in FIG. 3, during the time that the cursor waveform is applied to one horizontal line, sustain pulses are interrupted on each of the other horizontal lines. Thus, when the cursor scan waveform is applied to horizontal line 1 during the time interval T3 to T5, the sustain waveform on horizontal lines 2 and 3 is interrupted. This interruption is achieved by the switches 21A-21N shown in FIG. 1. The position of the switches, as shown in FIG. 1, corresponds to the scanning of line H2 wherein the special cursor scan waveform is applied during the time interval T9-T10. It should be understood that when horizontal line H1, for example, is to be scanned, then switches 21A and 21B would be positioned oppositely to that shown in FIG. 1, while switches 21C and 21N would remain the same as that shown.

It should be appreciated that when the scanning mode is not employed, the four bus or rail drive circuitry shown in FIG. 1 operates in a conventional manner whereby both the upper and lower horizontal buses have sustain signals on them, and thus each line of the horizontal axis of the panel receives the normal horizontal sustain signal, D in FIG. 3. Similarly both vertical buses supply a signal out of phase with the horizontal sustain signal. Thus the information stored in the panel is sustained independent of the position of the switches 21A-21N, 23A-23N of FIG. 1.

Typically, the upper bus of each axis as shown in FIG. 1 applies the sustain pulses with the write and erase pulses being selectively superimposed thereupon at appropriate times, via a transformer or the like. The lower bus of each axis may comprise a separate sustainer pulse source or, alternatively, may derive its pulses from the same sustainer pulse source as the upper bus driver. At write or erase time, then, the latches may be set so that all but the selected lines derive the sustain waveforms from the lower bus. In the same manner that the write or erase pulse is superimposed upon the sustain waveform, so also can the $2V_s$ pulse level of the special cursor scan waveform be achieved by the superposition of $V_s$ upon the sustain waveform.

Accordingly, when horizontal line H1 in FIG. 1 is to be scanned as represented by line A in FIG. 3, then, during the time interval T3-T6, switch 21A is positioned to the left-most contact while switches 21B-21A are positioned to the right-most contact. Gate signals, as shown in line I of FIG. 3, are applied to turn gate 39 on during the time interval that the cursor waveform is applied to a line. Thus, during the time interval T3-T6, gate 39 is operative to detect light pulses.

As can be seen with reference to FIG. 1, the overall scanning operation is initiated by a "start scan" signal applied to axis scanner 41. Axis scanner 41 provides the logic control circuitry for intiating scanning on the respective horizontal and vertical axis. Thus, with the initiation of a scan operation, axis scanner 41 activates the operation of an axis scan, such as the horizontal axis via horizontal scan logic 43. In addition, axis scanner 41 initiates the generation of the scanning signal sequences shown by the waveforms in the Figures (as in FIG. 3, for example) in bus drivers 15, 17, 27 and 29. After completion of the horizontal scan operation, control is returned to axis scanner 41, which then initiates operation of the vertical scan logic in accordance with the scan logic of block 45. It is evident that any of a variety of scan logics may be utilized, as is well known to those skilled in the art. For example, as hereinabove mentioned, a line-by-line operation may be readily utilized. Alternatively, as will be explained in more detail hereinafter, a binary or other group scanning technique may be carried out.

Using a line-by-line scanning operation, scan logic 43 sets horizontal start address control register 47 to the address of the first line to be scanned. Horizontal end address control register 49 is not used here. As shown, horizontal start address control register 47 and horizontal end address control register 49 are coupled to horizontal decoder 19, which decoder controls the setting of latches 9A-9N. With the start address in control register 47, the scanning sequence is set, and horizontal scan logic 43 acts to advance the horizontal start address register, and thus the line to be scanned, line by line, through all of the horizontal lines.

The horizontal decoder 19 decodes the horizontal start address register output such that the latch associated with the line being addressed is set to position its switch to the upper bus or rail while all nonaddressed lines are reset to position their switches to the lower rail. This decoding takes place with each change in the horizontal start address register, thus causing the switches to be sequenced one at a time to the upper rail. By this means, the cursor scan waveform is selectively applied in sequence to each horizontal line in the panel as illustrated by the waveforms of A, B, and C of FIG. 3.

The vertical lines are then scanned in a similar manner.

When light pen 1 in FIG. 1 detects a light pulse, the scanning operation for that axis may be terminated and the contents of horizontal start register represents the address of the line to which the pen is pointing. Thus, where a horizontal scanning operation is in effect, axis scanner 41, upon the receipt of an impulse indicative of light detection, acts to cause scan logic 43 to terminate the scanning sequence. At this point, the address of the line detected continues to be decoded by horizontal decoder 19 and can be used to create the horizontal line of a cross hair cursor to be displayed after the vertical line passing through the cell to be detected is determined. It can also be used to simplify vertical scanning as will be shown later.

Line F of FIG. 3 shows the light output pulses produced from a cell during the scanning of horizontal line number 1 when the cell is normally "off". As can be seen, these light pulses correspond to the rise and decline of the cursor scan waveform at T4 and T5, respectively. Line G of FIG. 3, on the other hand, corresponds to the light pulses produced from a cell during the scanning of horizontal line number 2 when the cell is normally "on." As can be seen, these latter light pulses correspond in time to both the rise and decline of the normal sustain signals but not to both the rise and decline of the cursor scan waveform. For purposes of time comparison, light pulses from an "off" cell in line 2 are shown by broken lines at times T9' and T10 in line G.

Line D in FIG. 3 shows the normal horizontal sustain signal as it appears in uninterrupted form. Line E, on the other hand, shows the vertical sustain signal that occurs when the horizontal axis is being scanned. It should be noted that every other vertical sustain pulse during the horizontal scan is foreshortened by an amount corresponding to, for example, the interval T5-T6. This is done to permit the vertical sustain axis to provide the zero voltage level interval of the applied scan voltage across a cell, prior to an excursion in the opposite direction. This interval can be seen by reference to line A of FIG. 2. In this regard, it should be appreciated that although the arrangement in FIG. 3 shows what may be characterized as a one half width mode wherein the levels $V_s$ and $2V_s$ occur over half of a sustain cycle, it is possible, for example, to divide the half sustain cycle into thirds whereby the levels $V_s$, $2V_s$ and zero volts may be achieved within this time period. Alternative arrangements, in which the various levels of the cursor waveform have other durations such as one half cycle or longer, are feasible. In this regard, it should be appreciated that the exact manner in which the required sequence of voltage levels is obtained is somewhat a matter of design choice, and that any of a variety of techniques may be utilized to achieve the same, the only conditions being that the specified sequence occur and that the three levels occur sufficiently long enough to permit full discharge of the cell.

As can be seen at time T9 in line G of FIG. 3, when the special cursor scan waveform is applied to a cell which is normally "on," a light pulse is produced at the leading edge of such waveform. However, upon the decline of such waveform at T10, no light pulse is produced. It is not until time T11 that a light pulse is produced. This can be seen more clearly with reference to FIG. 2 wherein line D shows the gas voltage on a cell which is initially "on," and the light output pulse that is produced therefrom. It is not until the cursor waveform crosses the zero voltage level and starts in the negative direction that a light output pulse is produced.

Line H of FIG. 3 shows the light pulses produced from a cell during the scanning of horizontal line H3 when the cell is normally "off." As can be seen, these pulses are analogous to those shown in line F. Line J shows the light pen output when the light pen is directed to horizontal line H2. Light pulses are shown for both the case when the cell to which the pen is directed on line H2 is "on" (T9) and when it is "off" (T9'). It should be noted that the light pen will only see light pulses from the line to which it is pointing. It should also be noted that the pen only detects the light pulses during gating time intervals, such as Tx-Ty, formed by the gate signal, represented in line I of FIG. 3. The gate blocks transmission of pen signals at all other time during the scan of line H2. Similarly, the gate blocks the pen signals except for a time interval encompassing the application of cursor waveform to each horizontal line. Line J light pen output pulses correspond to the position of switches 21A-21N and the horizontal position of the light pen, as shown in FIG. 1.

The cursor scan waveform that produces the light pen output pulses of line J is shown in line B. As can be seen, as each line receives the cursor waveform, during its associated scan interval, the sustain signal on all other lines is interrupted. Thus, where horizontal line H2 is receiving the cursor waveform, lines 1 and 3 have their sustain pulses interrupted. This interruption is achieved by horizontal and vertical bus drivers 15 and 17 which cause the cursor waveform to be applied to the upper bus at the same time sustain is interrupted on the lower bus. The waveforms on the upper buses comprise alternate cursor scan waveform signals and sustain signals, analogous to those shown in line A of FIG. 4.

After the horizontal axis has been scanned, in similar fashion the vertical axis is scanned by the operation of scan logic 45 via vertical start and end address registers 51 and 55 and vertical decoder 35. When the line on the vertical axis corresponding to the light pen position is detected, the vertical scan is interrupted and the address of the detected vertical line retained. The addresses corresponding to the horizontal and vertical lines detected may be used to generate a cursor at that point. Thus, the position of the respective sets of latches 9A-9N and 25A-25N, upon detection, may be maintained to produce a cross hair cursor. It is clear that all of the detected addresses may be conveyed to a processing unit for additional processing and control.

Although a linear line-by-line scanning sequence has been described, it is clear that any of a variety of scanning sequences may as readily be utilized. For example, a binary-type scanning approach may readily be employed. In such an instance, in a horizontal scan, all horizontal lines on one half of the panel, for example, are addressed by the cursor waveform. To achieve this the horizontal start and end address registers 47 and 49, respectively, are set to the address of the first and last line of the half panel being scanned. The decoder then sets all switches from the start address to the end address to the upper bus and resets all others to the lower bus.

If, within the half panel being addressed, a line is detected by the light pen, then this same half of the panel is subdivided into further halves for scanning. Accordingly, if within the half panel being addressed, a line is detected, scan logic 43 acts to set horizontal end address register 49, for example, to an address corresponding to one half of the half panel within which a line has been detected. On the other hand, if within the half panel being addressed no line is detected, then, scan logic 43 acts to set horizontal start and end address register 47 and 49 to the first and last line of the other half of the panel. The subdivision of lines continues in a logical manner in accordance with whether a line is detected or not detected in the current group of lines being scanned. As is evident, the last subdivision is a single line whose address corresponds to the position of the pen and is the correct address for the cursor. The step-by-step logical sequence of such type scanning is well known to those skilled in the art, and further detailed discussion of same here is considered unnecessary.

It should be noted that although for purposes of explanation a binary grouping approach, i.e., halves, has been discussed, any grouping of lines may be employed such as quarters, for example.

As hereinabove mentioned, tracking the motion of the light pen is accomplished by periodically repeating the scan, and updating the line address registers each time. In this mode, a sufficient number of regular sustain cycles are inserted so that the information pattern remains visible. It should be noted that, if it be required, the light pen may distinguish between normally "on" and normally "off" cells in its field of view. This can readily be accomplished by detecting the difference in discharge times between "on" and "off" cells in the pen gate interval.

Figure 5:
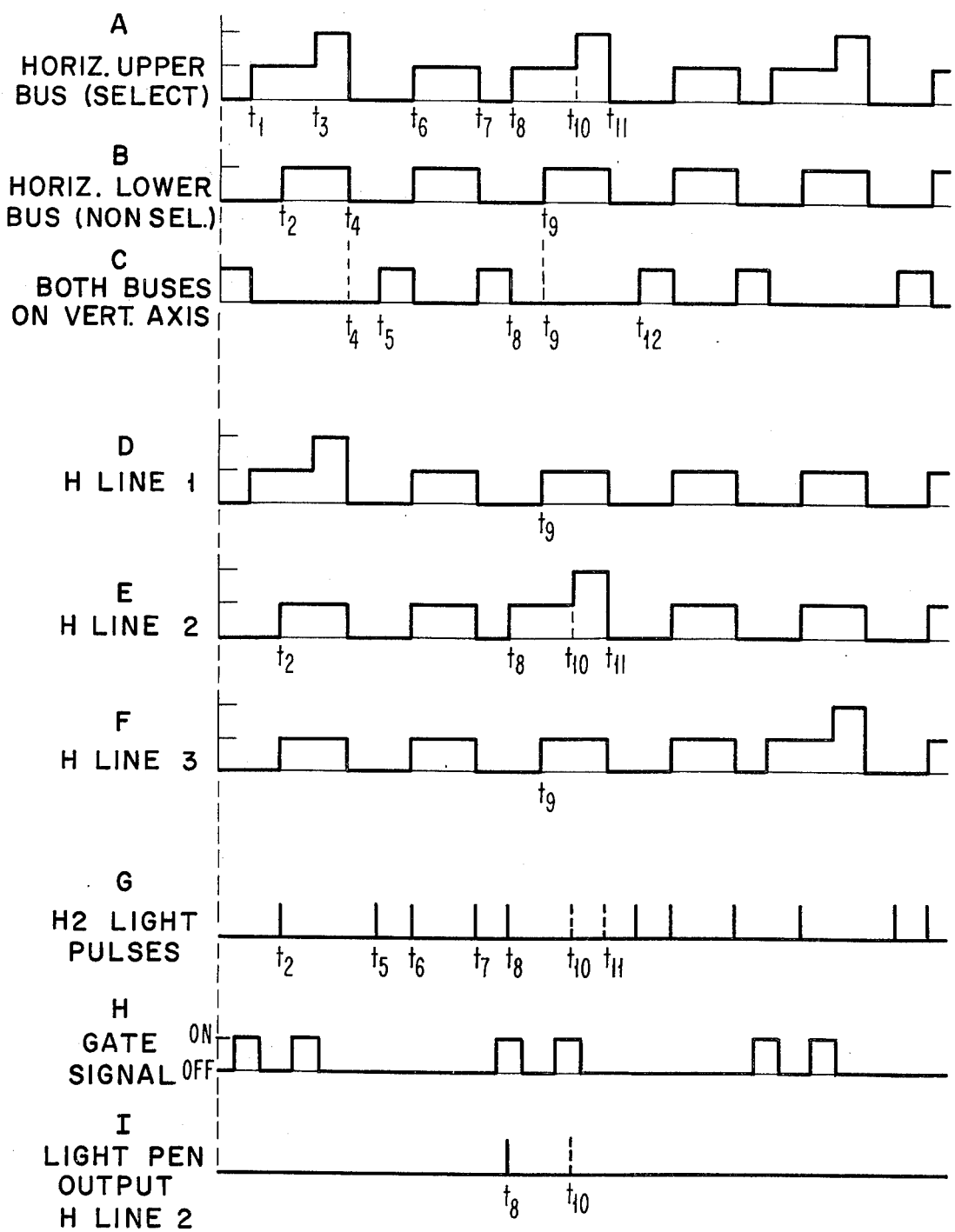
FIG. 5 shows a series of concurrent waveforms representative of the manner in which a line-by-line horizontal scan is achieved using the special cursor scan waveform wherein the leading edge of the waveform on selected rows is advanced in time over the leading edge of the waveform on nonselected rows whereby selected "on" cells are distinguished from nonselected "on" cells.

The concurrent waveforms shown in FIG. 5 represent a further embodiment of the light pen detection and tracking scheme, in accordance with the present invention. In this embodiment, the sustain signal is not interrupted on the nonselected lines (i.e., lines not receiving the scan cursor waveform). "Off" cells are detected by the time of their occurrence, as hereinabove described. On the other hand, since the sustain is not interrupted on the nonselected lines, "on" cells on selected lines are distinguished from "on" cells on nonselected lines by advancing the leading edge of the waveforms on the selected lines, such that "on" cells fire earlier on selected lines. One of the advantages to such an approach resides in the fact that the voltages between panel lines never exceed $V_s$ and line drivers see unipolar bus voltages of no more than $V_s$. As in the case with regard to the embodiment described with reference to FIG. 3, at least one sustain cycle is needed between detection cycles.

Line A in FIG. 5 shows the special cursor scan waveforms on horizontal upper bus 11 in FIG. 1 advanced by an amount T2-T1, T2 (Line B) being the time the sustain pulse normally commences. As can be seen in Line C, the sustain pulses for the vertical axis have been shortened by retarding the leading edge of the sustain pulse on one cycle and advancing the trailing edge on cycles alternate to the one cycle. The "retarding" can be seen between T4 and T5 and the "advancing" can be seen between T8 and T9. As hereinabove mentioned, the retarding between T4 and T5 is effected to provide the zero or ground level required for the cursor scan waveform on the opposite axis. On the other hand, the advancing between T8 and T9 is necessary because the cursor waveforms seen on the select scan lines of the horizontal upper bus have been advanced.

Lines D, E and F in FIG. 5 show the cursor scan waveforms sequentially inserted in the sustain waveform for horizontal lines 1, 2 and 3. Again, the position of switches 21A-21N, shown in FIG. 1, acts to provide the cursor scan waveform from the upper bus during the interval T8 to T11 to horizontal line 2, as shown in line E. Convenient latch switching times between T4 and T5 and between T11 and T12 allow switching of the switch latches while all buses are at ground potential.

Light pulses produced from an "on" cell of horizontal line 2 for the pulsing sequence shown in FIG. 5 are shown by the solid vertical lines in line G, while light pulses from an "off" cell of this line are shown by the broken vertical lines in line G. As can be seen, a light pen directed to an "on" cell in line 2 will see light pulses at times T2, T5, T6, T7, T8, etc. On the other hand, a light pen directed to an "off" cell in line 2 will see light pulses at T10 and T11. Whereas the cursor scan waveform occuring during the time interval that line 2 is selected produces a light pulse from an "on" cell at time T8, the "on" cells of nonselected lines 1 and 3 produce a light pulse at time T9. Accordingly, by gating light pen gate 39 on during the time that a light pulse from an "on" cell is caused by the leading edge of the cursor scan waveform on the selected line, the light pulse may be detected. This gating signal is shown in line H of FIG. 5. Likewise, by gating light pen gate 39 on during the time interval when an "off" cell from a selected line produces light pulses, the light pulses may be detected. This gating signal is also shown in line H of FIG. 5. Line I of FIG. 5 shows the light pen output pulses from the detected horizontal line, i.e., horizontal line 2, with the pulse represented at T8 being from a cell when it is "on" and the pulse represented at T9 being from the same cell when it is "off." Thus, as in the previous embodiment, not only can the line to which the light pen in directed be detected, but so also can the condition of the cell ("on" or "off") to which the pen is directed be detected.

Figure 4:
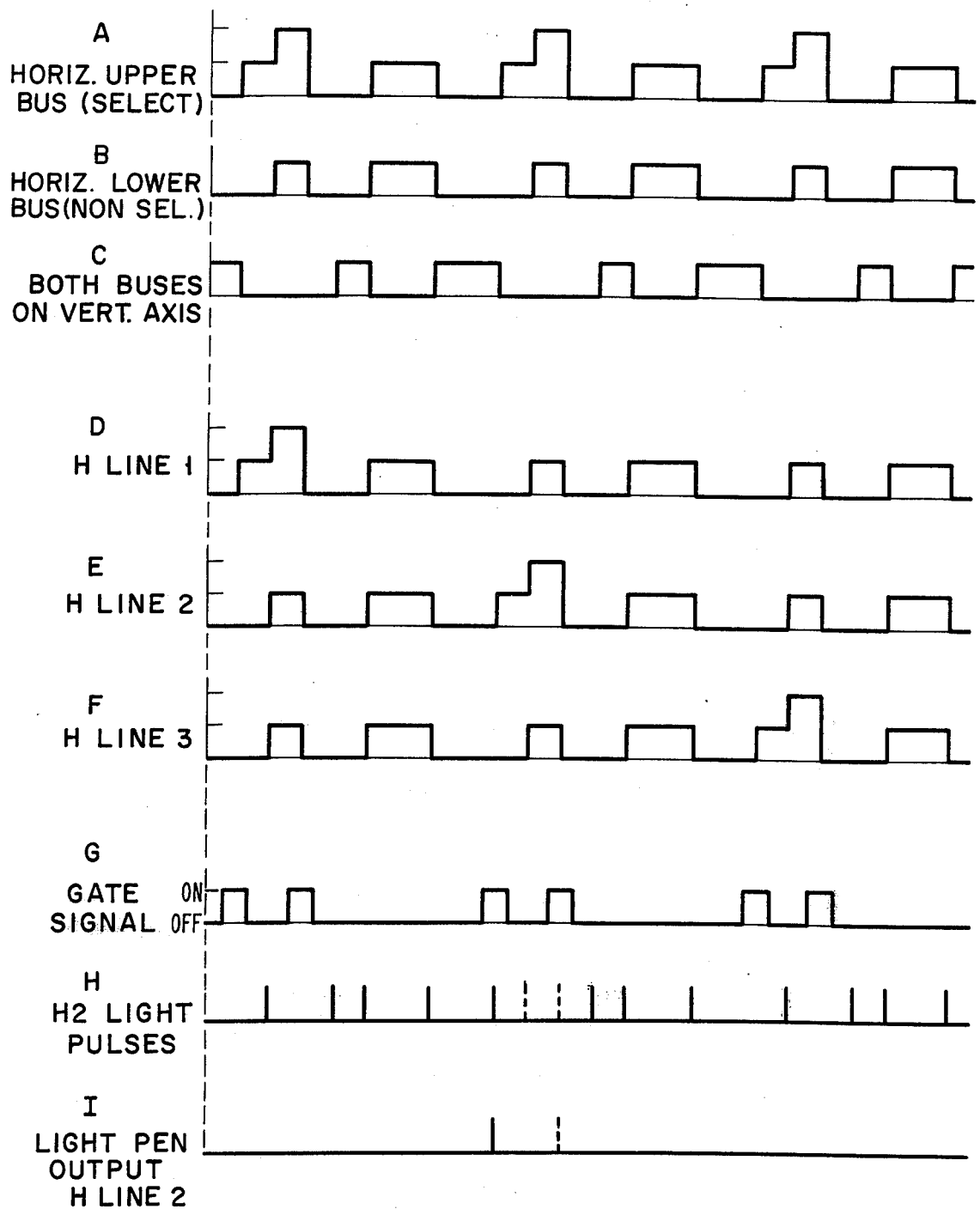
FIG. 4 shows a series of concurrent waveforms representative of the manner in which a line-by-line horizontal scan is achieved using the special cursor scan waveform with the leading edge of the waveform on the nonselected lines being retarded such that selected "on" cells may be distinguished from nonselected "on" cells.

In a further embodiment as represented by the waveforms shown in FIG. 4, rather than advance the leading edge of the waveforms on the selected line, the leading edge of the waveforms on the nonselected lines are retarded. This is done for the same purpose that the leading edge of the waveforms on the selected lines was advanced in FIG. 5, i.e., to distinguish between the "on" cells of selected lines from the "on" cells of nonselected lines. It should be noted that retarding the leading edge of nonselected lines has an advantage over advancing the leading edge of selected lines in that the sustain waveform now used on the nonselected lines may be the same as the sustain waveform used on the orthogonal axis, i.e., counter electrode waveform. This can be seen by reference to lines B and C in FIG. 4. By reducing the number of different waveforms required, operation is simplified. A further advantage resides in the fact that intervening sustain cycles are no longer necessary.

Other than the fact that the leading edge of the waveform on nonselected lines is retarded, as opposed to advancing the leading edge of the waveform on selected lines, the operation of the circuit of FIG. 1 in accordance with the waveforms of FIG. 4 is the same as that of FIG. 5. The time of occurrence of the light pulses from horizontal line 2, as shown in line H, is slightly different from those shown in line G of FIG. 5, for obvious reasons. Accordingly, the gate signal of line G has been modified in accordance therewith. In particular, although gate signals to light pen gate 39 are applied to detect light pulses produced from "on" cells effected by the leading edge of the cursor scan waveform, light pulses produced from "off" cells are produced by the trailing edge of the cursor scan waveform rather than the leading edge of the peak of the cursor scan waveform as in FIG. 5.

Figure 6:
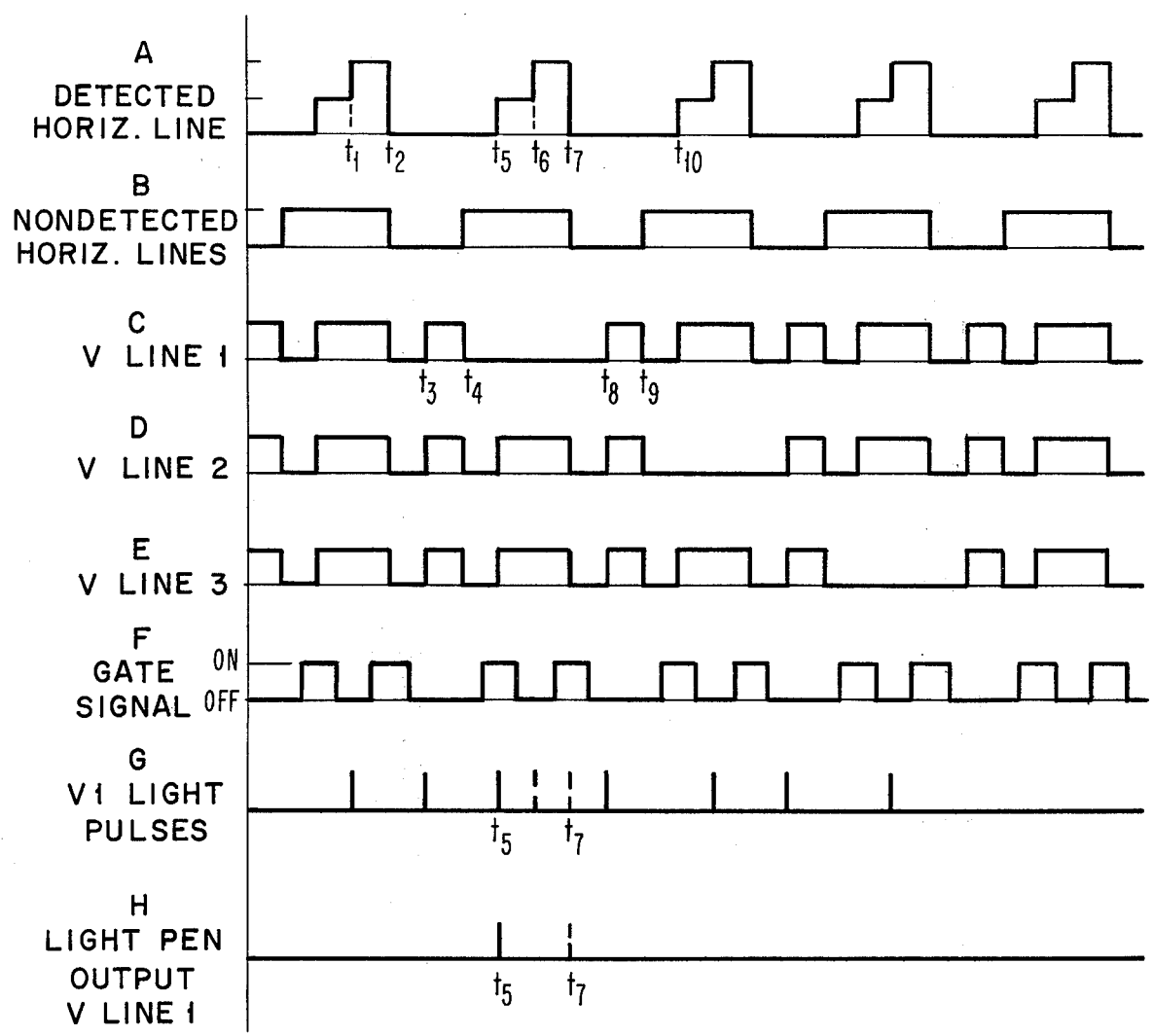
FIG. 6 shows a series of concurrent waveforms representative of a manner in which a horizontal and vertical scan may be achieved with the special cursor waveform applied to only one of the axes.

FIG. 6 shows an alternative scheme which may be utilized once the light pen has been localized to a single line of one of the axes. For example, when the light pen has been identified with a horizontal line, the vertical axis may then be scanned by leaving the cursor scan waveform on the horizontal line which has been detected as having the light pen directed thereto. Thus, as shown in line A of FIG. 6, the detected horizontal line has applied thereto successive cursor scan waveforms. It is clear that such successive waveforms will act to produce visible light emission from the detected horizontal line. The nondetected horizontal lines receive sustain waveforms as shown by line B in FIG. 6. With the detected horizontal line receiving the successive cursor scan waveforms of line A, the vertical axis is then scanned by applying deselect pulses of amplitude $V_s$ on all lines except the line being tested. As shown in line C,D, and E of FIG. 6, deselect scan pulses, such as that shown between T5 and T7, occur in sequence on the successive vertical lines. In this regard, the manner in which the normal deselect pulses on the vertical axis are interrupted to insert the scan deselect pulse may be the same as that described previously. In particular, the horizontal line to be scanned may be switched by the appropriate one of switches 23A-23N from one bus to the other and back again, such as from the lower bus to the upper and back again.

When a deselect scan pulse is applied to a vertical line, light pulses occur at different times than when the normal deselect pulses are applied. This is shown in line G of FIG. 6 wherein an "on" cell light pulse is produced at time T5 and an "off" cell light pulse is produced at time T7. At the intersection of vertical lines other than line 1 and the detected horizontal line, light pulses can occur at times T1, T3, T6, T8, T10, etc. but not at T5 or T7. At the intersection of vertical line 1 and nondetected horizontal lines light pulses can occur at times T3, T4, T8, T9, etc. but not at T5 or T7. At the intersection of vertical lines other than line 1 and nondetected horizontal lines, light pulses can occur at T3, T4, T8, T9, etc. but not at T5 or T7.

The light output pulses from detected vertical line 1, as they appear from an "on" and "off" cell for this scanning scheme, are shown in line H at times T5 and T7, respectively. It should be appreciated that the scanning scheme operation represented by the waveforms of FIG. 6 has the advantage of permitting the use of high voltage pulses on only one axis, i.e., in this example the horizontal axis. It is evident that either axis may be used to apply the high voltage pulses, in accordance with such a scheme.

While the invention has been particularly shown and described with reference to preferred embodiments thereof, it will be understood by those skilled in the art that various changes in form and details may be made therein without departing from the spirit and scope of the invention.

What is claimed is:

1. A method of detecting the position of a light pen on the display panel of an AC gas discharge display system, comprising:

applying at least one scan voltage complex to a plurality of lines of at least one of the horizontal and vertical axes of said display panel to cause light emission from both addressed "on" and addressed "off" cells thereof without a loss in the previous memory state of said cells, each said complex including at least a first component of at least a first voltage level of a magnitude approximately equal to the magnitude of the sustain voltage level $V_s$ for said display panel and of a sufficient duration to discharge fully said addressed "on" cells, a second component of at least a second voltage level of a polarity the same as and a magnitude approximately equal to twice that of said first voltage level and of a sufficient duration to discharge fully said addressed "off" cells, and a third component of at least a third voltage level of approximately zero volts and of a sufficient duration to discharge fully said addressed "off" cells and return them to their "off" state;

sensing light emission from said panel with said light pen; and detecting when said light emission is caused by said scan voltage complex.

2. The method as set forth in claim 1 wherein said scan voltage complex is applied during the sustain cycle of said display panel.

3. The method as set forth in claim 2 wherein said scan voltage complex causes "off" cells to nondestructively fire and emit light at times different from "on" cells.

4. The method as set forth in claim 3 wherein said scan voltage complex is applied to one axis of said display panel and then the other and wherein the sustain signal on the lines of said plurality of lines not receiving said scan voltage complex on the axis being scanned is interrupted.

5. The method as set forth in claim 3 wherein said scan voltage complex is applied to said plurality of lines in sequential manner, line by line, first to one axis and then the other.

6. The method as set forth in claim 3 wherein said scan voltage complex is applied to said plurality of lines in subdivided groups.

7. The method as set forth in claim 3 wherein said scan voltage complex is applied in advance of the sustain pulses of the sustain cycle to detect "on" cells.

8. The method as set forth in claim 3 wherein said scan voltage complex is applied to only one axis of said display panel.

9. The method as set forth in claim 3 wherein said scan voltage complex is applied to only one axis of said display panel with the lines of said one axis being subdivided into scanning groups whereby said scan voltage complex is applied to successively smaller groupings of said lines.

10. The method as set forth in claim 3 wherein said scan voltage complex is alternately applied to one axis of said display panel and then the other.

11. The method as set forth in claim 9 wherein said scan voltage complex is repetitively applied to said one axis.

12. A method of detecting and tracking the position of a light pen on an AC gas discharge display and memory device having an array of display and memory cells with each of said cells having one of its electrodes formed from a set of horizontal axis conductors comprising a horizontal array of parallel insulated conductors and the other of its electrodes formed from a set of vertical axis conductors comprising a vertical array of parallel insulated conductors in spaced-apart relationship with respect to said horizontal array of conductors, a volume of ionizable gas in the spaced-apart region between said horizontal and vertical array of insulated conductors, each of said cells further having the characteristic that they are sustained in their selected respective "on" states and "off" states of discharge when subjected to a sustain voltage between their respective electrodes which periodically alternates between voltage magnitudes on opposite sides of a neutral voltage, including the steps of;

sensing light emission from said gas discharge display and memory device with said light pen;

applying at least one scan voltage complex to a plurality of lines of at least one of the horizontal and vertical axes of said display panel to cause light emission from both addressed "on" and addressed "off" cells thereof without a loss in the previous memory state of said cells, each said complex including at least a first component of at least a first voltage level of a magnitude approximately equal to the magnitude of the sustain voltage level $V_s$ for said display panel and of a sufficient duration to discharge fully said addressed "on" cells, a second component of at least a second voltage level of a polarity the same as and a magnitude approximately equal to twice that of said first voltage level and of a sufficient duration to discharge fully said addressed "off" cells, and a third component of at least a third voltage level of approximately zero volts and of a sufficient duration to discharge fully said addressed "off" cells and return them to their "off" state; and detecting when said light emissionis caused by said scan voltage complex.

13. The method as set forth in claim 12 wherein said scan voltage complex is applied during the sustain cycle of said sustain voltage which is periodically alternating between voltage magnitudes on opposite sides of a neutral voltage.

14. The method as set forth in claim 12 wherein said scan voltage complex is applied to one of said sets of horizontal and vertical axis conductors and then the other and wherein the sustain voltage on those conductors of the set of conductors of the axis conductors being scanned not receiving said scan voltage complex is interrupted so that "on" cells may be detected.

15. The method as set forth in claim 12 wherein said scan voltage complex is applied to the conductors of at least one of said sets of said horizontal and vertical axis conductors in a line-by-line sequential pattern.

16. The method as set forth in claim 12 wherein said scan voltage complex is applied to the conductors of at least one of said sets of said horizontal and vertical axis conductors in subdivided groups of conductors such that said scan voltage complex is applied to successively smaller groupings of conductors in accordance with whether said light pen is detected or not.

17. The method as set forth in claim 16 wherein said scan voltage complex is applied to only one of said set of horizontal and vertical conductors.

18. The method as set forth in claim 12 wherein said scan voltage complex is applied in advance of the sustain pulses of said sustain voltage to detect "on" cells.

19. The method as set forth in claim 16 wherein said scan voltage complex is repetitively applied to the conductors of at least one of said sets of said horizontal and vertical axis conductors.

20. In an AC gas discharge display system including a light pen and an AC display panel and drive circuitry means therefor with said drive circuitry means having both horizontal and vertical drive circuitry means for providing addressing and sustain pulses to the respective horizontal and vertical lines of said panel, the improvement comprising a drive circuitry scanning arrangement for detecting the position of said light pen on said panel, said drive circuitry scanning arrangement comprising, pulse means in at least one of said horizontal and vertical drive circuitry means for providing scan voltage complexes to particular ones of at least one set of said horizontal and vertical lines to nondestructively cause light emission from both addressed "on" and addressed "off" cells in said panel, said pulse means providing scan voltage complexes each having at least a first component of at least a first voltage level having a magnitude approximately equal to that of the magnitude of the sustain voltage level $V_s$ for said display panel and of a sufficient duration to discharge fully said addressed "on" cells, at least a second component of at least a second voltage level having a polarity the same as the polarity of said first voltage level and a magnitude approximately equal to twice that of the sustain voltage level $V_s$ and of a sufficient duration to discharge fully said addressed "off" cells, and at least a third component of at least a third voltage level approximately equal to zero volts and of a sufficient duration to discharge fully said addressed "off" cells and return them to their "off" state, and gating means for selecting light pulse indications at times corresponding to said light emission caused by said voltage complexes.

21. The system as set forth in claim 20 wherein said scan voltage complexes each include at least an excursion of polarity opposite to that of said first and second components after the occurrence of said third component and prior to the occurrence of the next scan voltage complex waveform.

22. The system as set forth in claim 21 wherein at least one of said horizontal and vertical drive circuitry means includes an upper and lower bus and means for switching between said upper and lower bus so that at least one of said scan voltage complexes may successively be switched to selected lines of said at least one set of horizontal and vertical lines to insert said at least one of said scan voltage complexes into the sustain voltage waveform to said lines.

23. The method as set forth in claim 1 including the step of:
applying to said cells having had said light emission at least an excursion of sustain voltage $V_s$ and of polarity opposite to that of said first and second components after the occurrence of said third component and prior to the occurrence of the next scan voltage complex at said latter cells.

24. The method as set forth in claim 12 including the step of:
applying to said cells having had said light emission at least sustain voltage $V_s$ and of polarity opposite to that of said first and second components after the occurrence of said third component and prior to the occurrence of the next scan voltage complex at said latter cells.

25. The system as set forth in claim 20 including:
means for applying to said cells having had said light emission at least an excursion of sustain voltage $V_s$ and of polarity opposite to that of said first and second components after the occurrence of said third component and prior to the occurrence of the next scan voltage complex at said latter cells.

* * * * *